United States Patent
Bylund et al.

(10) Patent No.: US 11,071,427 B2
(45) Date of Patent: Jul. 27, 2021

(54) CRUISE CONTROL OF PORTABLE GARDEN OR FORESTRY TOOL

(71) Applicant: HUSQVARNA AB, Huskvarna (SE)

(72) Inventors: Christian Bylund, Huskvarna (SE); Mikael Arvidsson, Huskvarna (SE); Pierre Lanquist, Huskvarna (SE); Pär Martinsson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 449 days.

(21) Appl. No.: 16/098,554

(22) PCT Filed: Apr. 28, 2017

(86) PCT No.: PCT/SE2017/050415
§ 371 (c)(1),
(2) Date: Nov. 2, 2018

(87) PCT Pub. No.: WO2017/192087
PCT Pub. Date: Nov. 9, 2017

(65) Prior Publication Data
US 2019/0150688 A1    May 23, 2019

(30) Foreign Application Priority Data

May 4, 2016  (SE) .................................. 1650600-8

(51) Int. Cl.
*A47L 9/28*      (2006.01)
*A01G 20/47*   (2018.01)
(Continued)

(52) U.S. Cl.
CPC ............ *A47L 9/2842* (2013.01); *A01G 20/47* (2018.02); *A47L 5/14* (2013.01); *A47L 9/28* (2013.01);
(Continued)

(58) Field of Classification Search
CPC ........ A47L 9/2842; A47L 9/28; A47L 9/2857; A47L 5/14; A01G 20/47; F04D 27/004; F04D 25/0673; F04D 25/02; F04D 25/068
See application file for complete search history.

(56) References Cited

U.S. PATENT DOCUMENTS

| 5,842,277 A | 12/1998 | Häberlein et al. |
| 2002/0153237 A1 | 10/2002 | Covell et al. |
(Continued)

FOREIGN PATENT DOCUMENTS

| JP | H02-163427 A | 6/1990 |
| WO | 2015/176735 A1 | 11/2015 |

OTHER PUBLICATIONS

Notice and Search Report for Swedish Application No. 1650600-8 dated Dec. 15, 2016.
(Continued)

*Primary Examiner* — David Redding
(74) *Attorney, Agent, or Firm* — Burr & Forman, LLP

(57) ABSTRACT

A handheld power tool comprises a cruise control actuator (22), which is mechanically connected to a controller input actuator (27) so as to variably move the controller input actuator (27) in a trigger direction (T) based on the position of the cruise control actuator (22). The cruise control actuator (22) is movable between a plurality of different, stable cruise speed positions, in which the cruise control actuator (22) is connected to said controller input actuator (20) in a unidirectional manner to allow a trigger (20) to move the controller input actuator (27) even further in the trigger direction (T) without moving the cruise control actuator (22). The cruise control actuator (22) is also movable to an "OFF" position in which it mechanically blocks the trigger (Continued)

(20) from moving the controller input actuator (27) in the trigger direction (T). Suggested figure for publication.

15 Claims, 5 Drawing Sheets

(51) Int. Cl.
*F04D 27/00* (2006.01)
*A47L 5/14* (2006.01)
*F04D 25/06* (2006.01)

(52) U.S. Cl.
CPC .......... *A47L 9/2857* (2013.01); *F04D 27/004* (2013.01); *F04D 25/0673* (2013.01)

(56) References Cited

U.S. PATENT DOCUMENTS

2005/0011491 A1 1/2005 Muller et al.
2006/0219218 A1 10/2006 Yuasa

OTHER PUBLICATIONS

International Search Report and Written Opinion for International Application No. PCT/SE2017/050415 dated Jul. 26, 2017.
International Preliminary Report on Patentability for International Application No. PCT/SE2017/050415 dated Nov. 6, 2018.

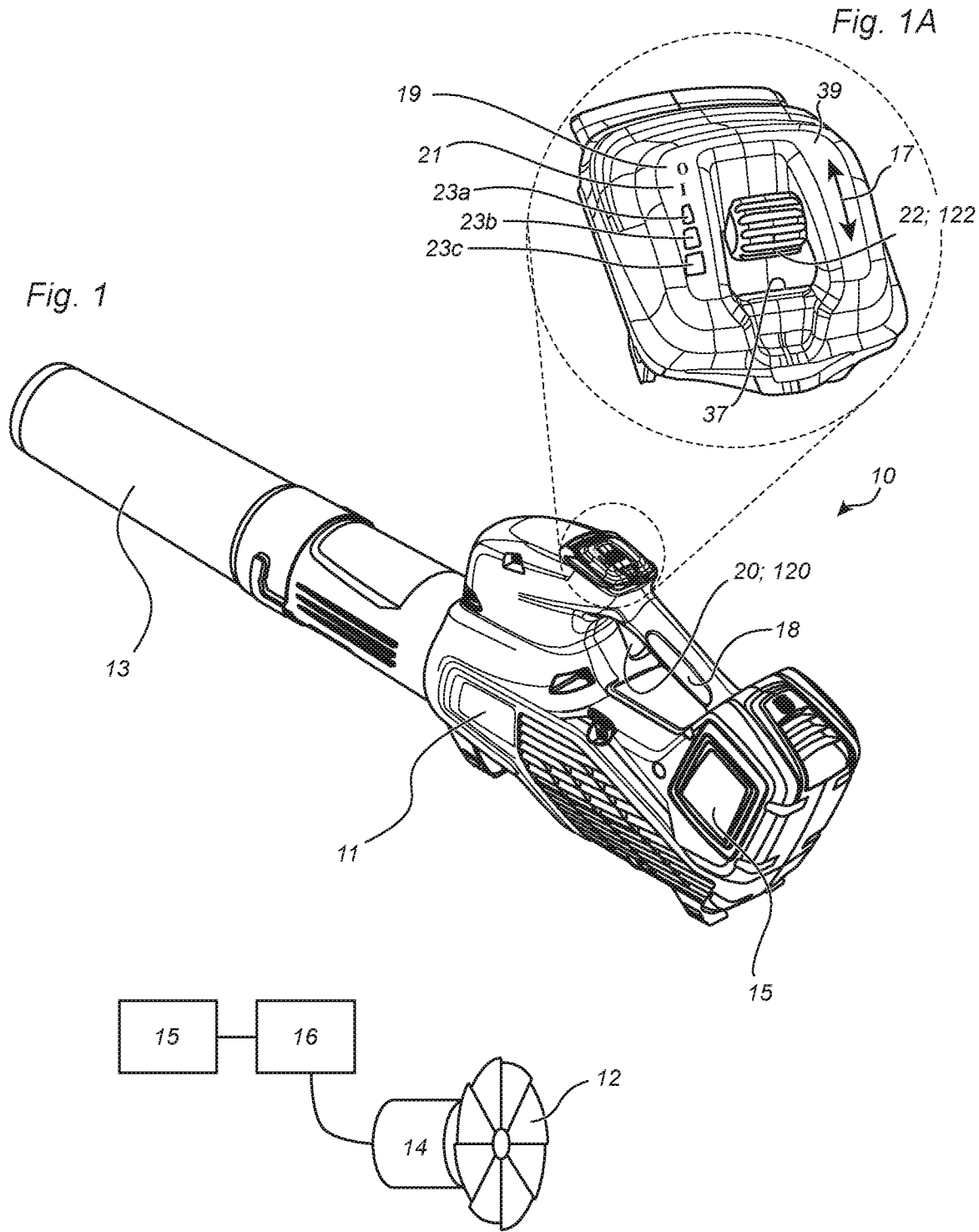

CRUISE CONTROL OF PORTABLE GARDEN OR FORESTRY TOOL

FIELD OF THE INVENTION

The present invention relates to a portable garden or forestry power tool.

BACKGROUND OF THE INVENTION

There is an incessant strive to render garden and forestry work easier and more convenient. WO2015/176735 discloses a leaf blower provided with a cruise control function, which facilitates operation of the leaf blower for extended periods of time. However, there is a demand for simplifying garden and forestry work even further.

SUMMARY OF THE INVENTION

It is an object of the present invention to solve, or at least mitigate, parts or all of the above mentioned problems. To this end, there is provided a portable garden or forestry power tool comprising a powered tool part configured to perform garden or forestry work; a drive motor configured to drive the powered tool part; a motor speed controller configured to control the speed of the drive motor based on the position of a controller input actuator; a handle for operating the power tool, the handle being provided with a mechanical trigger operably connected to the motor speed controller so as to, when the trigger is pressed by a user, move the controller input actuator in a trigger direction to variably increase the speed of the drive motor, wherein the controller input actuator is configured to, when released, resiliently return in a release direction opposite to the trigger direction; and a cruise control actuator, which is mechanically connected to said controller input actuator so as to variably move the controller input actuator in the trigger direction based on the position of the cruise control actuator, the cruise control actuator being configured to be moved by the user between a plurality of different, stable cruise speed positions corresponding to a respective plurality of different positions of the controller input actuator, in which cruise speed positions the cruise control actuator is connected to said controller input actuator in a unidirectional manner to allow the trigger to move the controller input actuator even further in the trigger direction without moving the cruise control actuator. Such an arrangement provides for an inexpensive cruise control that is convenient and intuitive to use. Moreover, the unidirectional connection between actuator and trigger allows a user to press the trigger to increase the speed at any time, if a higher speed than the presently set cruise speed is temporarily needed. The trigger and the controller input actuator may be formed together as a e.g. two ends of a single, integral body. Alternatively, they may be separate devices, which may be mechanically interconnected in a positive or non-positive manner. The cruise control actuator, which may be a lever, slider, knob, selector or any other suitable multiple-position user input control, may be mechanically connected to the controller input actuator either directly, via the trigger, or via any other suitable transmission. The cruise control actuator may also be movable to an "OFF" position, in which it mechanically blocks the trigger from moving the controller input actuator in the trigger direction. In the "OFF" position, no electrical power is provided to the motor. Thereby, no separate on/off switch is needed, since the trigger is mechanically deactivated by the cruise control actuator when the cruise control actuator is in off position. The cruise control actuator may block the trigger from moving either by engaging with trigger itself, or by engaging with controller input actuator such that the controller input actuator blocks the trigger. According to an embodiment, the cruise control actuator is configured to, when in the "OFF" position, engage positively, i.e. in a rigid, form-fitting manner, with the trigger. Preferably, the engagement is self-locking, i.e. the cruise control actuator and trigger/controller input actuator are positioned in such a relation to each other that the cruise control actuator cannot be moved out of its blocking position by pressing the trigger the harder the user presses the trigger, the stronger the blocking engagement.

According to an embodiment, the motor speed controller is configured to provide, based on the position of the controller input actuator, an electrical control signal to the drive motor. Such an arrangement may be particularly well suited for controlling an electrical drive motor. The electrical control signal may be analogue or digital. By way of example, the motor speed controller may comprise or consist of a mechanical input device such as a potentiometer, electrical switch or similar, which is configured to be actuated by the controller input actuator. The motor speed controller may be configured to select, based on the position of the controller input actuator, one of a plurality of discrete, predefined speeds, or to allow the speed to be continuously ramped in proportion to the controller input actuator position/trigger depression. Alternatively, the motor speed controller may be entirely mechanical; by way of example, the trigger may be mechanically connected to the throttle of a carburettor providing an air/fuel mixture to an internal combustion engine drive motor.

According to an embodiment, the cruise control actuator is pivotal about a cruise control actuator axis, and the trigger is pivotal about a trigger axis.

According to an embodiment, the cruise control actuator axis and the trigger axis are substantially parallel.

According to an embodiment, the cruise control actuator comprises a trigger blocker extending radially from the cruise control axis; and the trigger comprises a blocker support located at a distance from said trigger axis, the blocker support facing substantially tangentially, with respect to the trigger axis, towards the cruise control actuator axis, wherein the cruise control actuator is pivotal to a lock position in which the trigger blocker faces radially towards the blocker support of the trigger, such that when the trigger is pressed, the blocker support presses onto the trigger blocker against the radial direction of the cruise control actuator axis. Thereby, when the cruise control actuator is in "OFF" position, the force applied to the cruise control actuator by the trigger will be directed substantially radially, and will not strive to turn the cruise control actuator out of the "OFF" position.

According to an embodiment, the portable garden or forestry power tool further comprises a rigid link connected eccentrically to each of the trigger and the cruise control actuator, wherein the rigid link is connected to at least one of the trigger and the cruise control actuator in a slidable engagement with a stop at an end position of the slidable engagement. Such an arrangement forms a reliable and efficient unidirectional engagement, wherein the slidable engagement may allow the trigger to be depressed without moving the cruise control actuator, while the stop allows the cruise control actuator to move the trigger when the slidable engagement is at the end position. Alternatively, the link may be non-rigid and formed by e.g. a flexible string, which may in such an arrangement define a unidirectional engagement by allowing the transmission of pull, but not of push, between the trigger and the cruise control actuator.

According to an embodiment, the cruise control actuator is configured to maintain its position when the controller input actuator is moved even further in the trigger direction from the set cruise speed, such that the cruise control actuator thereby defines a stop position for the controller input actuator when it is returned in the release direction.

According to an embodiment, the cruise control actuator is movable to a cruise control actuator position corresponding to a highest cruise speed, wherein when in said cruise control actuator position, the controller input actuator is not at a controller input actuator end position corresponding to a maximum speed of the drive motor. Such an arrangement discourages the user from abusing the power tool by running the power tool at too high speed for elongated periods of time.

According to an embodiment, the trigger has a trigger end position corresponding to a maximum speed of the drive motor, wherein the motor speed controller is configured to, upon reaching the trigger end position, generate a temporary increase of motor speed, and thereafter lower the speed to a maximum cruise speed. Such an arrangement prevents the user from abusing the power tool by running the power tool at too high speed for elongated periods of time. The duration of the temporary increase of motor speed may be pre-configured, and may be pre-configured to be, by way of example, between 2 and 20 seconds. Thereafter, the controller may de-activate the possibility of again generating a temporary increase of speed for a predetermined period of time, so as to allow the drive motor some time to cool down.

According to an embodiment, the trigger is depressible into the handle from below. Such a configuration is particularly suitable for operating the trigger with the index finger of the hand holding the handle.

According to an embodiment, the controller input actuator is connected to a resilient element, such as a spring, urging the controller input actuator in the release direction.

According to an embodiment, the cruise control actuator and trigger are positioned such that, when the power tool is held by the handle, the cruise control actuator is configured to be operated by a thumb of a user's hand, and the trigger is configured to be operated by an index finger of said hand.

According to an embodiment, the portable garden or forestry power tool is a battery-powered leaf blower, and the powered tool part is a fan. The invention is particularly well suited for leaf blowers, since leaf blowers are often continuously operated as the user pushes a pile of leaves in front of the blower nozzle. In order to increase battery time, it is desirable that the leaf blower be continuously operated at a limited speed, or power, while the trigger permits an occasional increase of RPM to lift particularly sticky leaves off the ground.

According to an embodiment, said plurality of stable cruise speed positions are discrete, and defined by a respective plurality of predefined, distinct positions of the cruise control actuator.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1 is a diagrammatic view in perspective of a leaf blower;

FIG. 1A is a detail view of a cruise control actuator of the leaf blower of FIG. 1;

FIG. 2 is a functional block diagram schematically illustrating a drive unit of the leaf blower of FIG. 1;

DETAILED DESCRIPTION OF THE EXEMPLARY EMBODIMENTS

Figure 3:
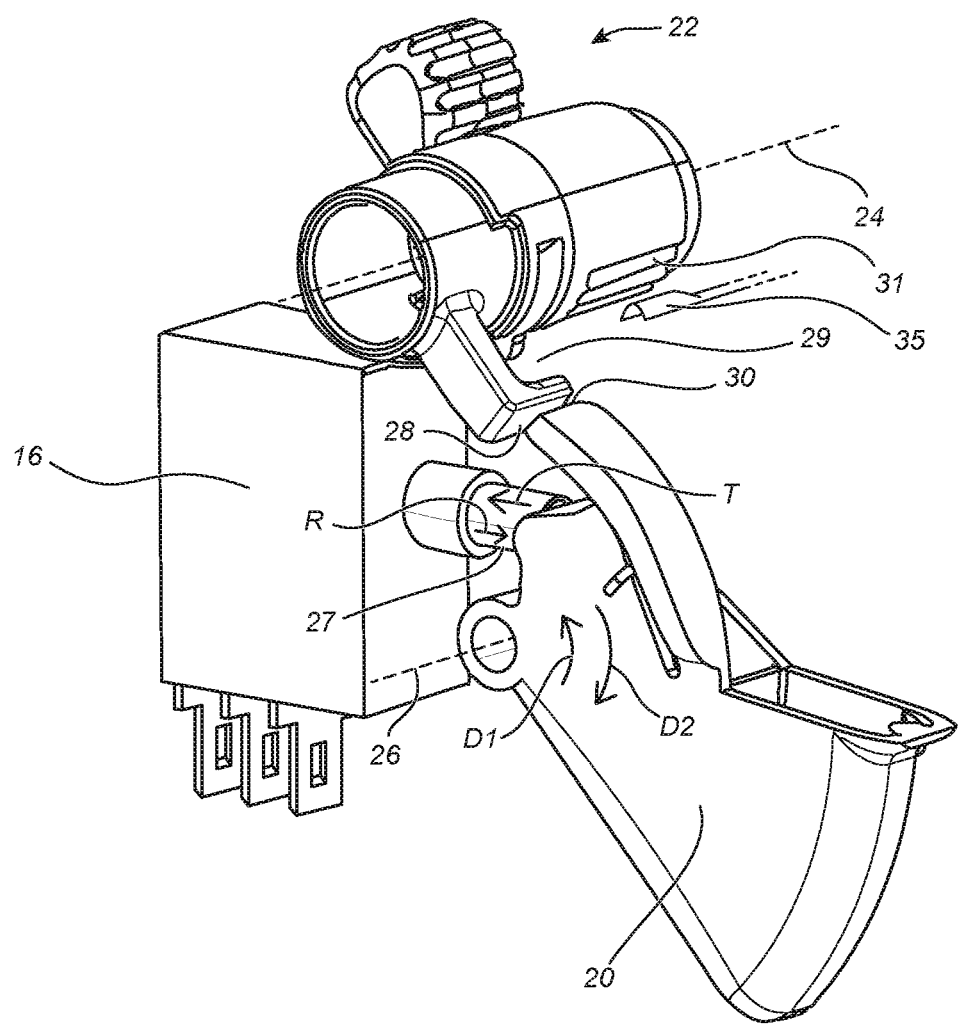
FIG. 3 is a schematic view in perspective of a first embodiment of a cruise control and trigger mechanism of the leaf blower of FIG. 1.

FIG. 1 illustrates a handheld leaf blower 10 comprising a drive unit 11 for generating a flow of air, and a nozzle 13 for directing the generated air flow onto leaves and debris to be moved by the leaf blower 10.

The drive unit 11 is schematically illustrated in FIG. 2. A fan 12 is configured to generate the air flow to be provided to the nozzle 13 (FIG. 1). The fan 12 is connected to an electrical drive motor 14, which is configured to rotate the fan 12, and a controller 16 is configured to, based on input from an operator (not shown) operating the leaf blower 10, control the speed of the drive motor 14. In the illustrated example, the controller 16 controls the speed of the drive motor 14 by controlling the supply of electrical power from a battery 15 to the drive motor 14.

Referring back to FIG. 1, the leaf blower 10 is provided with a handle 18 for holding and operating the leaf blower 10. A trigger 20 is arranged on a lower face of the handle 18, and is depressible into the handle 18 from below. The trigger 20 is positioned so as to be easily accessible by the operator's index finger, when the operator holds the leaf blower 10 by the handle 18. A cruise control actuator 22 is arranged on an upper face of the leaf blower 10, and is positioned near a front portion of the handle 18 so as to be accessible by the thumb of the hand holding the handle 18. As is illustrated in the detail view of FIG. 1A, the cruise control actuator 22 is configured to be moved along a path illustrated by an arrow 17 between a plurality of positions, each position corresponding to a state of the leaf blower 10. In the illustrated example, the positions are an "OFF" position 19 for setting the leaf blower 10 in an "OFF state, in which the leaf blower 10 does not respond to the trigger 20; an "ON" position 21 for setting the leaf blower 10 in an "ON" state, in which it is configured to operate the motor 14 (FIG. 2), and consequently the fan 12, if and only if the trigger 20 is depressed; and three different cruise speed positions 23a-c, each cruise speed position corresponding to a respective cruise speed of the motor 14 (FIG. 2), which speed is maintained when the trigger 20 is released.

FIG. 3 illustrates the trigger 20, the controller 16, and the cruise control actuator 22 in greater detail, with the cruise control actuator 22 in the "OFF" position. The trigger 20 is pivotal about a trigger axis 26, and when turned about the trigger axis 26 in a first direction D1 corresponding to a depression of the trigger 20 into the handle 18 (FIG. 1), pushes a controller input actuator 27 in a trigger direction T into the controller 16. The motor speed controller 16 comprises electronics configured to provide an electrical power to the drive motor 14 (FIG. 2) which varies with the extent to which the controller input actuator 27 has been pushed in the trigger direction T. The controller input actuator 27 is biased in a return direction R towards the trigger 20 by a trigger return spring (not shown), so as to resiliently return when the trigger 20 is released, thereby pivoting the trigger 20 in a second direction D2 opposite to the first direction D1. The cruise control actuator 22 is pivotal about a cruise control actuator axis 24, which is parallel to the trigger axis 26. An indexing arrangement, for defining distinct, discrete positions of the cruise control actuator 22, comprises a set of grooves 31, which are distributed along the periphery of the cruise control actuator 22 and concentric with the cruise control actuator axis 24, and a leaf spring 35 biased against the grooves 31. The cruise control actuator 22 is provided with a trigger blocker 28, which extends radially from the cruise control axis 24, and the trigger 20 is provided with a blocker support 30 located at a distance from the trigger axis 26 and facing substantially tangentially, with respect to the trigger axis 26, towards the cruise control actuator axis 24.

Figure 4A:
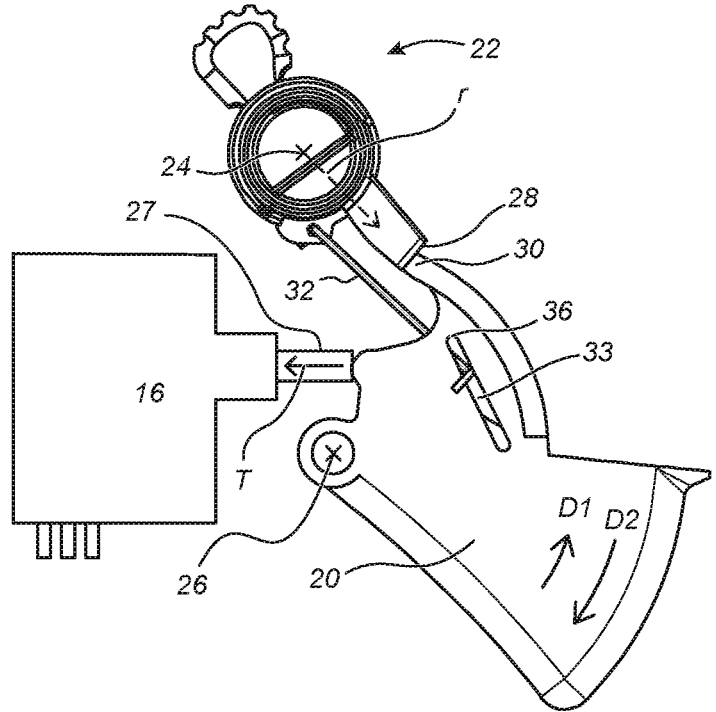
FIG. 4a is a schematic side view of the cruise control and trigger mechanism of FIG. 3, when in an "OFF" position.

FIG. 4a is a side view which more clearly illustrates the position of the trigger 20 and cruise control actuator 22 of FIG. 3. When the cruise control actuator 22 is in the illustrated "OFF" position, the trigger blocker 28 faces radially away from the cruise control actuator axis 24 and towards the blocker support 30, such that when the trigger 22 is pressed, the blocker support 30 presses onto the trigger blocker 28 against the radial direction r of the cruise control actuator axis 24. Expressed differently, the trigger 20 is locked such that it cannot be depressed, no matter how hard the user presses it.

Figure 4B:
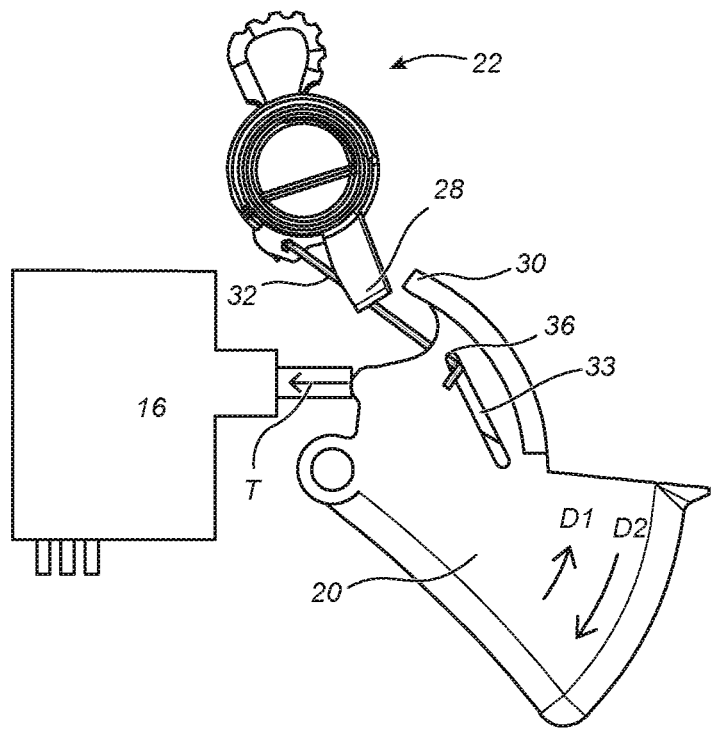
FIG. 4b is a schematic side view of the cruise control and trigger mechanism of FIG. 3, when in an "ON" position.

FIG. 4b illustrates the controller 16, trigger 20, and cruise control actuator 22 with the cruise control actuator 22 set in the "ON" position. When in the illustrated position, the trigger blocker 28 no longer blocks the trigger 20 from moving, but instead allows the blocker support 30, which elongatedly extends along the tangential direction about the trigger axis 26, to pass through a radially, with respect to the cruise control actuator axis 24, inner space 29 (FIG. 3), behind the trigger blocker 28. Thereby, the trigger 20 can be pressed, allowing the leaf blower (FIG. 1) to be operated. A metal pull rod 32 defines a rigid link between the trigger 20 and the cruise control actuator 22. A first end of the pull rod 32 is eccentrically connected to the cruise control actuator 22, such that turning the cruise control actuator 22 about the cruise control actuator axis 24 moves the pull rod 32 substantially along its longitudinal direction. A second end of the pull rod 32 is slidably connected to an elongate slot 33 extending along the trigger 20 in a direction substantially tangential to, and at a distance from, the trigger axis 26. When the trigger 20 is pressed in the first direction D1, thereby pressing the controller input actuator 27 in the trigger direction T, the pull rod 32 is allowed to slide along the slot 33 without turning the cruise control actuator 22 about the cruise control actuator axis 24. An end position 36 of the slot 33 defines a stop for the slidable engagement between the pull rod 32 and the slot 33, such that the pull rod 32, the slot 33 and the end position 36 together define a unidirectional engagement between the cruise control actuator 22 and the trigger 20.

Figure 4C:
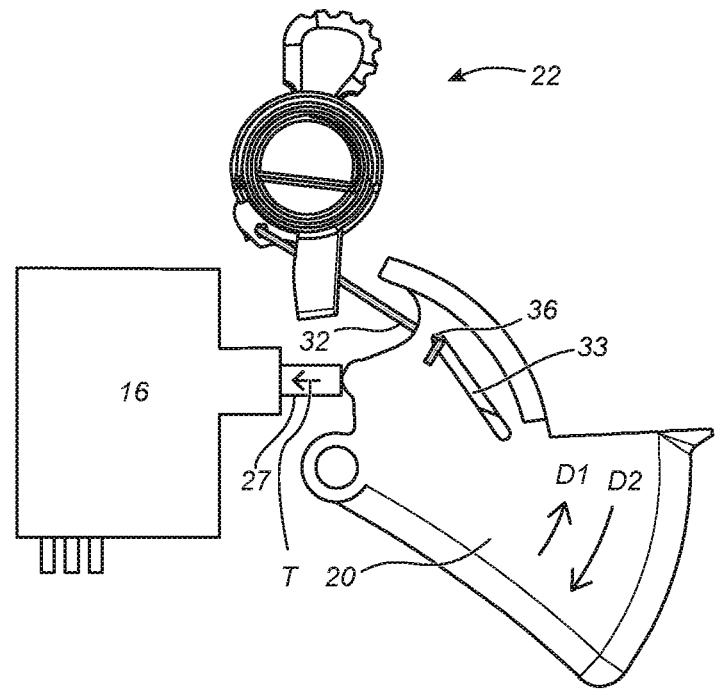
FIG. 4c is a schematic side view of the cruise control and trigger mechanism of FIG. 3, when in a first cruise speed position.

FIG. 4c illustrates the controller 16, trigger 20, and cruise control actuator 22 with the cruise control actuator 22 set in the first cruise speed position 23a (FIG. 1A). When moving the cruise control actuator 22 from the position illustrated in FIG. 4b to the position illustrated in FIG. 4c, the pull rod 32 engages with the trigger 20 at the end position 36 of the slot 33, and by pulling at the end position 36 turns the trigger 20 about the trigger axis 26 to a first cruise speed position of the trigger 20. Expressed differently, the pull rod 32 draws the trigger 20 into the handle 18 (FIG. 1) to a first cruise speed position, in which the controller input actuator 27 (FIG. 3) has been partly pushed into the controller 16 in the trigger direction T, thereby providing electrical power corresponding to a first cruise speed to the drive motor 14 (FIG. 2).

Figure 4D:
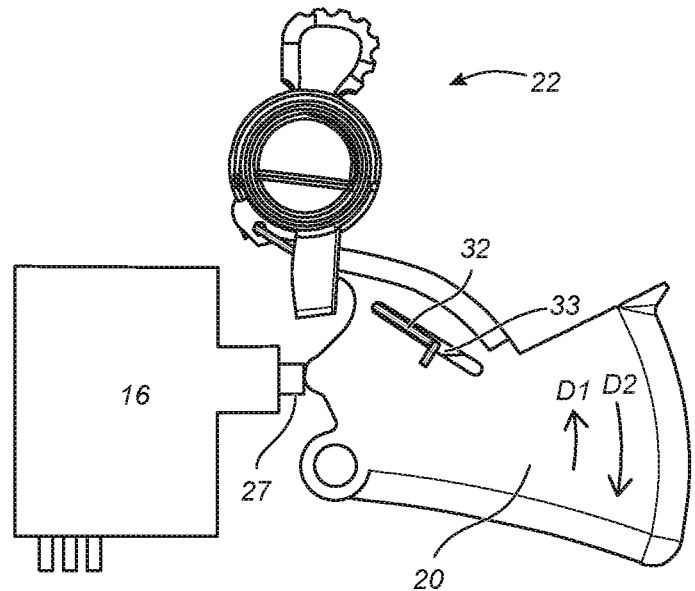
FIG. 4d is a schematic side view of the cruise control and trigger mechanism of FIG. 3, when in the first cruise speed position of FIG. 4c, and the trigger has been further depressed.

In the position illustrated in FIG. 4c, the trigger 20 can still be pressed further in the first direction D1 without moving the cruise control actuator 22, since the pull rod 32 is still allowed to slide along the slot 33. FIG. 4d illustrates the controller 16, trigger 20, and cruise control actuator 22 when the trigger 20 has been pressed even further into the handle 18 (FIG. 1) from the position of FIG. 4c. The cruise control actuator 22 maintains its first cruise speed position such that when the trigger 20 is released again, it will stop at the end position 36 of the slot 33, i.e. at the first cruise speed position defined by the cruise control actuator 22.

By turning the cruise control actuator 22 even further about the cruise control actuator axis 24, to the cruise speed position 23b or 23c (FIG. 1A), the trigger 20 is pulled even deeper into the handle 18, thereby obtaining the second and third cruise speeds corresponding to the second and third cruise speed positions 23b, 23c of the cruise control actuator 22. The moving range of the cruise control actuator 22 is limited by a stop edge 37 (FIG. 1A) of a cruise control actuator frame 39 such that when at the highest cruise speed, corresponding to the cruise control actuator position 23c (FIG. 1A), the trigger 20 can be even further depressed, thereby even further increasing the speed of the drive motor 14 (FIG. 2). This discourages the leaf blower operator from running the leaf blower at maximum speed for extended periods of time, which increases the life expectancy of the leaf blower 10. The controller 16 may also comprise logic configured to generate, when the trigger is depressed to its bottom position, a temporary increase of motor speed, and to thereafter automatically lower the speed.

Figure 5A:
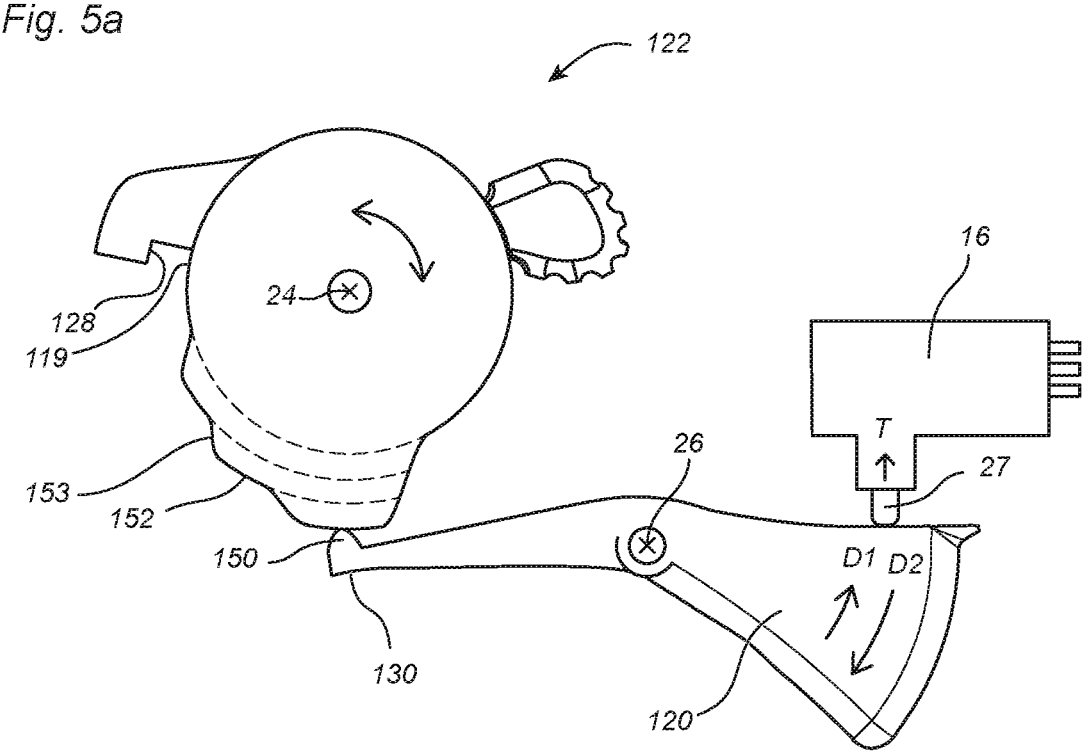
FIG. 5a is a schematic side view of a second embodiment of a cruise control and trigger mechanism of the leaf blower of FIG. 1, when in a third cruise speed position.
Figure 5B:
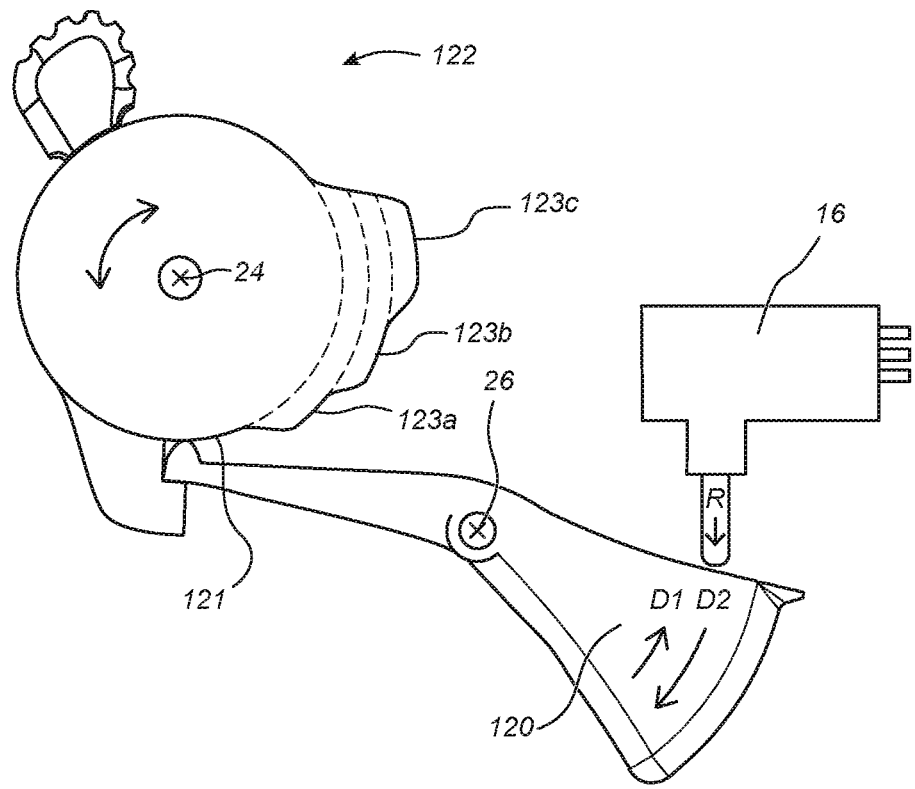
FIG. 5b is a schematic side view of the cruise control and trigger mechanism of FIG. 5a, when in an "OFF" position.

FIGS. 5a-b illustrate a second embodiment of the trigger and cruise control mechanism of the leaf blower 10 (FIG. 1). The mechanism comprises a trigger 120, a controller 16, and a cruise control actuator 122. FIG. 5a illustrates the mechanism in the third cruise speed position 23c (FIG. 1A), and FIG. 5b illustrates the mechanism in the "OFF" position 19, in which the trigger 120 is locked. Referring back to the first embodiment illustrated in e.g. FIG. 4c, the cruise control actuator 22 is unidirectionally connected to the trigger 20 via a pull rod 32 slidably connected to the trigger 20 with an end position 36, whereas according to the second embodiment of FIGS. 5a-b, the unidirectional connection is formed by a direct, abutting engagement between a cam follower portion 150 of the trigger 120 and a cam face 152 of the cruise control actuator 122. The trigger 120 is configured to pivot about a trigger axis 26, and is urged into engagement with the cam face 152 by the spring bias of the controller input actuator 27. In the cruise control actuator position of FIG. 5a, the trigger 120 can be pressed further in the first direction D1, such that the cam follower portion 150 of the trigger 120 disengages from the cam face 152 of the cruise control actuator 122.

In the "OFF" position of FIG. 5b, a trigger blocker face 128 (FIG. 5a) of the cruise control actuator 122, facing radially towards the cruise control actuator axis 24, engages with a blocker support face 130 (FIG. 5a) of the trigger 120, such that the trigger 120 is prevented from being depressed. FIG. 5b also illustrates a plurality of cam portions 121, 123a, 123b, 123c of the cam face 152, which cam portions are configured to engage with the cam follower portion 150 of the trigger 120 as the cruise control actuator 122 is turned about the cruise control actuator axis 24 between the different positions 19, 21, 23a, 23b, 23c (FIG. 1A). Each cam portion 121, 123a, 123b, 123c of the cam face is located at a different respective radial distance from the cruise control actuator axis 24. In particular, the cam portion 121 corresponds to the "ON" position 21, and the cam portions 123a-c correspond to the cruise speed positions 123a-c of the cruise control actuator 122 (FIG. 1A). Smooth, inclined slopes 153 between the cam portions 121, 123a, 123b, 123c allow the cruise control actuator 122 to be turned without depressing the trigger 120. Distinct cruise control actuator positions may e.g. be provided by notches (not illustrated) in the cam portions 121, 123a, 123b, 123c, configured to engage with the tip of the cam follower portion 150.

The invention has mainly been described above with reference to a few embodiments. However, as is readily appreciated by a person skilled in the art, other embodiments than the ones disclosed above are equally possible within the scope of the invention, as defined by the appended patent claims.

For example, a leaf blower 10 has been described. However, the invention may be applied also to other portable garden or forestry power tools where the ability to conveniently and intuitively set a stable cruise speed is desired. Clearly, the powered tool part may in such a tool be different from a fan, and may be e.g. a hedge trimmer blade. Moreover, a cruise control actuator provided with discrete, distinct positions has been described. However, the teachings herein may also be applied to a cruise control actuator configured to provide a continuous, step-less cruise control speed range.

The invention claimed is:

1. A portable garden or forestry power tool comprising
a powered tool part configured to perform garden or forestry work;
a drive motor configured to drive the powered tool part;
a motor speed controller configured to control the speed of the drive motor based on the position of a controller input actuator; and
a handle for operating the power tool, the handle being provided with a mechanical trigger operably connected to the motor speed controller so as to, when the trigger is pressed by a user, move the controller input actuator in a trigger direction to variably increase the speed of the drive motor, wherein the controller input actuator is configured to, when released, resiliently return in a release direction opposite to the trigger direction,
the power tool further comprising
a cruise control actuator, which is operably coupled to said controller input actuator so as to variably move the controller input actuator in the trigger direction based on the position of the cruise control actuator, the cruise control actuator being configured to be moved by the user between a plurality of different, stable cruise speed positions corresponding to a respective plurality of different positions of the controller input actuator, in which cruise speed positions the cruise control actuator is connected to said controller input actuator in a unidirectional manner to allow the trigger to move the controller input actuator even further in the trigger direction without moving the cruise control actuator, wherein the cruise control actuator further is movable to an "OFF" position in which the cruise control actuator mechanically blocks the trigger from moving the controller input actuator the trigger direction.

2. The power tool according to claim 1, wherein the cruise control actuator is configured to, when in the "OFF" position, engage with the trigger in a rigid, form-fitting manner.

3. The power tool according to claim 1, wherein the motor speed controller is configured to provide, based on the position of the controller input actuator, an electrical control signal to the drive motor.

4. The power tool according to claim 1, wherein the cruise control actuator is pivotal about a cruise control actuator axis, and the trigger is pivotal about a trigger axis.

5. The power tool according to claim 4, wherein the cruise control actuator axis and the trigger axis are substantially parallel.

6. The power tool according to claim 4, wherein
the cruise control actuator comprises a trigger blocker extending radially from the cruise control axis; and
the trigger comprises a blocker support located at a distance from said trigger axis, the blocker support facing substantially tangentially, with respect to the trigger axis, towards the cruise control actuator axis, wherein the cruise control actuator is pivotal to a lock position in which the trigger blocker faces radially towards the blocker support of the trigger, such that when the trigger is pressed, the blocker support presses onto the trigger blocker against the radial direction of the cruise control actuator axis.

7. The power tool according to claim 4, further comprising a rigid link connected eccentrically to each of the trigger and the cruise control actuator, wherein the rigid link is connected to at least one of the trigger and the cruise control actuator in a slidable engagement with a stop at an end position of the slidable engagement.

8. The power tool according to claim 1, wherein the cruise control actuator is configured to maintain its position when the controller input actuator is moved even further in the trigger direction from the set cruise speed, such that the cruise control actuator thereby defines a stop position for the trigger when the cruise control actuator is returned in the release direction.

9. The power tool according to claim 1, wherein the cruise control actuator is movable to a cruise control actuator position corresponding to a highest cruise speed, wherein when in said cruise control actuator position, the controller input actuator is not at a controller input actuator end position corresponding to a maximum speed of the drive motor.

10. The power tool according to claim 1, wherein the trigger has a trigger end position corresponding to a maximum speed of the drive motor, wherein the motor speed controller is configured to, upon reaching the trigger end position, generate a temporary increase of motor speed, and thereafter lower the speed to a maximum cruise speed.

11. The power tool according to claim 1, wherein the trigger is depressible into the handle from below.

12. The power tool according to claim 1, wherein the controller input actuator is connected to a resilient element, such as a spring, urging the controller input actuator in the release direction.

13. The power tool according to claim 1, wherein the cruise control actuator and trigger are positioned such that, when the power tool is held by the handle, the cruise control actuator is configured to be operated by a thumb of a user's hand, and the trigger is configured to be operated by an index finger of said hand.

14. The power tool according to claim 1, wherein the portable garden or forestry power tool is a battery-powered leaf blower, and the powered tool part is a fan.

15. The power tool according to claim 1, wherein said plurality of stable cruise speed positions are discrete, and defined by a respective plurality of predefined, distinct positions of the cruise control actuator.

* * * * *